US010103937B1

(12) United States Patent
Thompson et al.

(10) Patent No.: US 10,103,937 B1
(45) Date of Patent: Oct. 16, 2018

(54) SYSTEM AND METHOD FOR CENTRAL ADMINISTRATION OF MULTIPLE APPLICATION ENVIRONMENTS

(71) Applicant: STATE FARM MUTUAL AUTOMOBILE INSURANCE COMPANY, Bloomington, IL (US)

(72) Inventors: Eric Thompson, Bloomington, IL (US); Steven Frobish, Bloomington, IL (US); Christopher Douglas Prather, Metamora, IL (US); Paul Richard Stalsworth, Bloomington, IL (US); Darren Lee Habben, Bloomington, IL (US); Richard Clark, Oakwood, IL (US); Diane Martin, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 794 days.

(21) Appl. No.: 14/591,711

(22) Filed: Jan. 7, 2015

Related U.S. Application Data

(60) Provisional application No. 62/007,232, filed on Jun. 3, 2014.

(51) Int. Cl.
*H04L 12/24* (2006.01)
*H04L 29/08* (2006.01)

(52) U.S. Cl.
CPC ......... *H04L 41/0806* (2013.01); *H04L 67/10* (2013.01)

(58) Field of Classification Search
CPC .................................................. H04L 41/0806
See application file for complete search history.

(56) References Cited

U.S. PATENT DOCUMENTS

| 8,484,355 | B1 * | 7/2013 | Lochhead | H04L 41/0806 709/222 |
| 8,577,937 | B1 * | 11/2013 | Offer | G06F 17/3007 707/821 |
| 2001/0037475 | A1 * | 11/2001 | Bradshaw | G06F 8/71 714/15 |
| 2008/0196043 | A1 * | 8/2008 | Feinleib | G06F 11/0712 719/319 |

(Continued)

*Primary Examiner* — Jerry B Dennison
(74) *Attorney, Agent, or Firm* — Marshall, Gerstein & Borun LLP; Randall G. Rueth

(57) ABSTRACT

A computer-implemented method for deploying application environments is presented. A central day server may receive a selection of two or more application environment and capture configuration data for two or more application environments. The data server may further deploy the application environments. Deploying each application environment may include: creating a directory required by the application environment, adding one or more users for each application environment, and/or adding one or more connection objects for each application environment. A user interface for the central administration of multiple applications and/or application environments may include functionality related to, and/or visually represent items associated with, (1) an environment status dashboard; (2) an application setup wizard; (3) application modification; (4) application deployment; and/or (5) application or environment administration.

18 Claims, 5 Drawing Sheets

(56) References Cited

U.S. PATENT DOCUMENTS

| | | | | |
|---|---|---|---|---|
| 2010/0185693 A1* | 7/2010 | Murty | ............ | G06Q 10/06 |
| | | | | 707/803 |
| 2011/0093279 A1* | 4/2011 | Levine | ............ | G06F 19/326 |
| | | | | 705/2 |
| 2011/0251992 A1* | 10/2011 | Bethlehem | ............ | H04L 12/2863 |
| | | | | 707/610 |
| 2012/0246170 A1* | 9/2012 | Iantorno | ............ | G06F 8/77 |
| | | | | 707/748 |
| 2012/0265726 A1* | 10/2012 | Padmanabhan | ............ | G06F 17/303 |
| | | | | 707/602 |
| 2012/0287039 A1* | 11/2012 | Brown | ............ | G06F 3/0488 |
| | | | | 345/156 |
| 2013/0198827 A1* | 8/2013 | Bhaskaran | ............ | G06F 21/552 |
| | | | | 726/7 |
| 2014/0180961 A1* | 6/2014 | Hankins | ............ | G06Q 10/10 |
| | | | | 705/348 |
| 2015/0135163 A1* | 5/2015 | Mun | ............ | G06F 8/71 |
| | | | | 717/120 |
| 2015/0278513 A1* | 10/2015 | Krasin | ............ | G06F 9/5005 |
| | | | | 726/30 |
| 2017/0140015 A1* | 5/2017 | Rangadass | ............ | G06F 17/30563 |
| 2017/0161059 A1* | 6/2017 | Wood | ............ | G06F 9/45558 |

\* cited by examiner

SYSTEM AND METHOD FOR CENTRAL ADMINISTRATION OF MULTIPLE APPLICATION ENVIRONMENTS

RELATED APPLICATIONS

This application claims the benefit of U.S. Provisional Application No. 62/007,232, filed Jun. 3, 2014, which is incorporated by reference herein in its entirety.

FIELD OF THE INVENTION

The present disclosure generally relates to a system and method for central management and administration of multiple application environments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Informatica® develops the PowerCenter® suite of products. Informatica® Corporation's best practice is to split out environments by purpose and/or by business line. Accordingly, many Informatica® deployments have more than one environment to administrator. Larger deployments may have upwards of thirty-five unique environments to administrator with hundreds of applications and users.

Administration is a manual process which requires accessing numerous workstation applications and a web portal to configure and deploy environments. It may also be required to access a Linux®, UNIX® and/or or other operating system server to configure as many as twenty-one file systems or more, as well as configure security settings for each application environment. Furthermore, administrators manually accessed each environment/server and performed manual data entry or run commands/scripts in each unique environment/server.

These manual tasks are very time consuming and required accessing each unique environment/server. As with most manual processes there is a high rate of error due to the amount of settings required to appropriately configure and secure an application. Furthermore, data collection for auditing of environments was adhoc and inefficient. As the use of this product expands, a more efficient way of managing the environments used in an Informatica® PowerCenter® deployment is required.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a computer-implemented method for deploying application environments may be provided. The method may include receiving, via a computer network, a selection of a first and a second application environment and capturing, at a central processing server, configuration data for the first and second application environment, wherein the configuration data include user data and connection data. The method may further include deploying, by one or more processors, a first application environment, including: (a) creating, by the one or more processors, a first directory required by the first application environment; (b) adding, by the one or more processors, one or more users to the first application environment based upon the user data; and/or (c) adding, by the one or more processors, one or more connection objects based upon the connection data. The method may also include deploying a second application environment including: (d) creating, by the one or more processors, a second directory required by the second application environment; (e) adding, by the one or more processors, one or more users to the second application environment based upon the user data, and/or (f) adding, by the one or more processors, one or more connection objects based upon the connection data.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
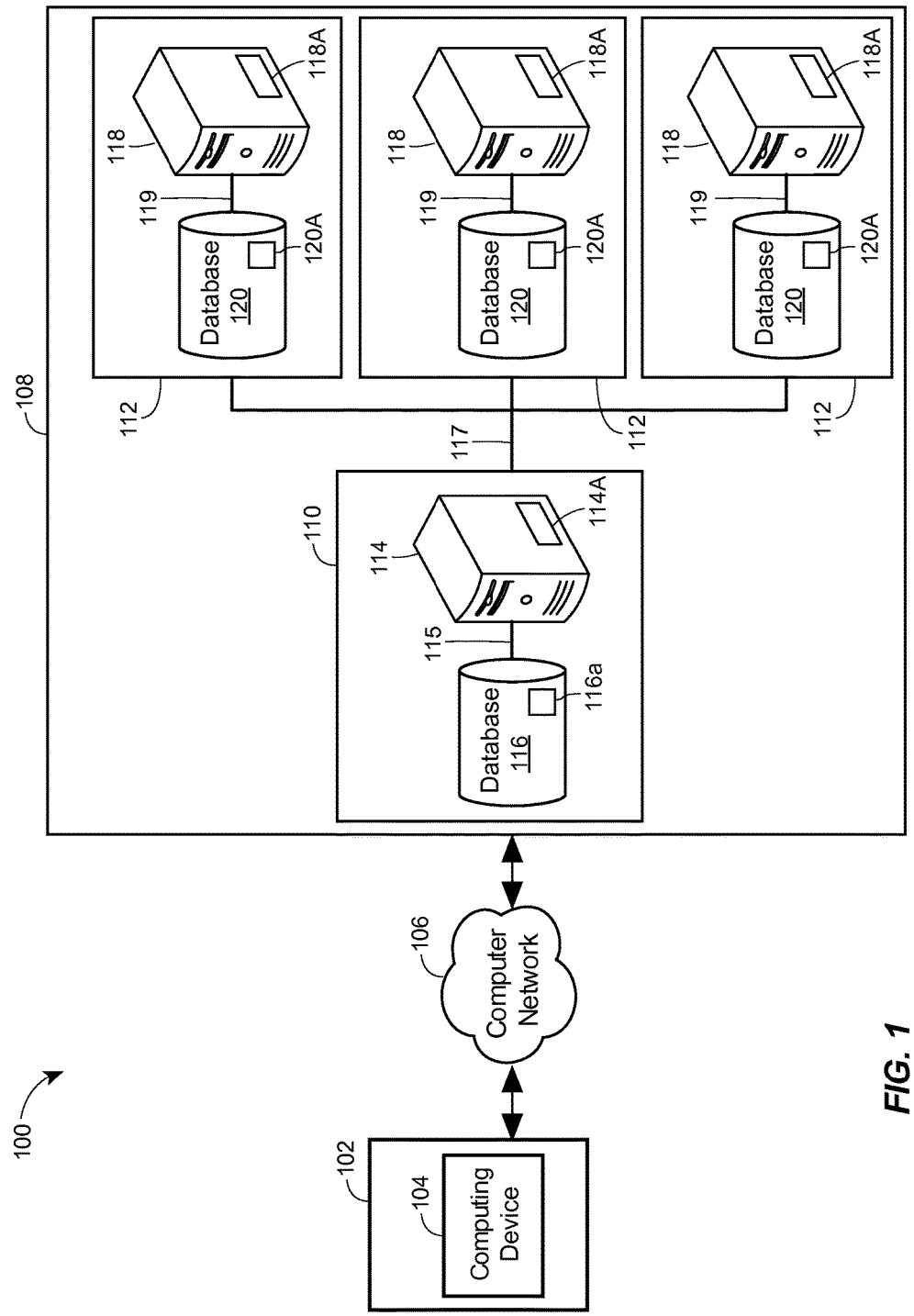
FIG. 1 is a simplified and exemplary block diagram of a system and method for central administration of multiple application environments.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present embodiments relate to, inter alia, a system and method for central administration of multiple application environments. The present embodiments may include a central processing server for performing management and administration tasks for Informatica® or other computing environments, including environments that may include data warehouses and/or data integration software and applications. The computing environments may include (a) user, group, and/or object creation, (b) environment management, including capturing data, such as data from UNIX® servers, Linux® servers and/or one or more servers running another operating system, and/or a PowerCenter® metadata repository, and/or (c) producing reports on the computing environment information.

Furthermore, the system may collect additional metadata for auditing/reporting purposes. The central administration concept may leverage Informatica® or other API's, Linux®, UNIX® and/or other shell scripting, database tables, and/or web interfaces to automate deployment of application environments in a more efficient, consistent and secure manner. Because, in one embodiment, the central administration solution developed moves the work to a webpage, it may be performed by anyone with computer experience and may not require specialized training, such as dedicated Informatica® training.

I. Exemplary User Interface and Related Functionality

In one aspect, a user interface for the central management or administration of multiple applications or computing environments may be provided. The user interface may allow for the (1) management of metadata for auditing and/or reporting; (2) consistency in application and/or computer environment set up; (3) security across multiple applications or computing environments; (4) rapid setup or deployment of multiple applications or computing environments; and/or (5) reduced number of applications required to perform setup for various users.

The user interface may provide or facilitate the input, and/or viewing, of many features of the central management or administration functionality discussed herein. A number of the exemplary user interface features and functionalities are discussed below.

A. Exemplary Status Dashboard Functionality

An exemplary feature is a status display or dashboard. The status dashboard may include functionality for presenting (1) environment health; (2) database catalogs; (3) actions required; (4) updated outage impact; and/or (5) application setup information. The status dashboard may include graphically depicting and/or visually presenting other types of information. The status dashboard may include additional, less, or alternate functionality, including functionality discussed elsewhere herein.

The status dashboard may display an environment health for an administrator's (or other user's) view. The status dashboard may provide, for example, an at-a-glance view by domain. In one embodiment, green font or icons may represent or depict satisfactory items, while red font or icons may represent or depict problem areas that need investigation.

The environment health functionality may include the user interface being configured to allow a user to click on a domain name to drill down for more granular statuses. Drilling down may result in the user interface graphically depicting and/or visually representing, on the display screen, domain level health items. The domain level health items visually depicted may include domain backups; repository backups; node statues; quick reference links to domain services (admin console, reporting service, and/or analyst service); and/or log retention processes.

Additionally or alternatively, drilling down may result in the user interface graphically depicting and/or visually representing, on the display screen, node specific statuses. The node specific health items displayed or otherwise presented may include: disaster backups (configurations required to quickly restore an environment); database client versions; server release information; uptime; file system statuses (indicator for negative or positive trending); and/or miscellaneous items that may be deleted.

The status dashboard may include functionality for and/or associated with viewing database catalogs. Such functionality may include a search utility that may pull all of the database catalogs in use to one location. The status dashboard may present a link on the user interface that allows user to add and/or remove connections or catalogs. The status dashboard may also present a link to a report detailing which connection objects utilize each database catalog.

The status dashboard may include functionality associated with presenting or otherwise displaying actions required by the administrator or other user. The status dashboard may include a generic dashboard that captures and/or tracks issues that may require actions and/or owners. The status dashboard may include functionality related to, and for displaying, core files, and/or process monitoring and environmental discrepancies.

The status dashboard may include functionality related to and/or associated with updating outage impact. For instance, the status dashboard (and/or user interface) may present information related to, and/or list, all failed service ping or other entries, and/or may be configured to provide the ability to make specific updates for accurate outage reporting.

The status dashboard may include functionality related to application setup and/or install. The status dashboard (and/or user interface) may graphically represent and/or visually depict recent application setup requests and the status thereof (in progress, complete, removed, cancelled, etc.). The status dashboard (and/or user interface) may be configured to allow a user to search for historical requests to view the status of the historical requests. The status dashboard may also include a link that presents the administrator (or other user) with a page or screen that allows the administrator (or other user) to edit the application setup and/or install process.

B. Exemplary Application Setup Wizard Functionality

The exemplary user interface may include an application setup wizard and/or related functionality. The setup wizard functionality may include a set of web forms configured to facilitate data capture and/or initiate application setup process. The setup wizard may include functionality related to a validation of requirements performed during entry of data. Each individual component required for the application setup may be captured and/or associated with a common key for reporting and/or maintenance.

In one embodiment, the application setup wizard may include a number of webpages and/or user interface pages or screens. For instance, the first page of the application setup wizard may capture various types of information and/or data. The information and/or data captured may relate to (1) an application name; (2) an application description; (3) a project number; (4) an implementation timeline (per environment and/or test-production); (5) source systems; (6) estimated server execution times; (7) type of target environment and/or location; (8) existing Linux®, UNIX®, and/or operating system security (e.g., if additional structure to existing project is to be added); (9) change management record number; (10) sensitive data status; and/or additional information.

A second page/screen of the application setup wizard may capture information related to file system estimates per environment (broken out by major type, i.e. source files, target files, cache, etc.). A third page/screen may capture information related to users and/or their role (coordinators/leads; developers; test analysts—including employment and/or termination dates). A fourth page/screen may capture information related to connection details. For post processing, an exemplary confirmation page or screen may display or represent Linux®, UNIX® and/or other operating system, administrator form, and/or other setup instructions. In one embodiment, the setup wizard may directly call the administrator and/or an email confirmation may be sent to the business partners with setup instructions.

C. Exemplary Application Modification Functionality

The exemplary user interface may include the ability for a user to modify an application and/or related functionality. The user interface may include a display or visual representation of a grouping of options to make changes to existing applications. Also, "User" and/or "Application" search functionality may be available on this screen to perform the appropriate sub tasks.

The application modification functionality of the present embodiments (and/or user interface) may include the ability to (a) remove applications; (b) update security functionality; (c) update application electronic space, storage, or memory requirements; (d) update application (authorized) users; (e) update connections; and/or (f) update object security. The user interface may include additional, less, or alternate application modification functionality, including that discussed elsewhere herein.

The application modification functionality of the user interface may include the ability to remove an application from a user environment. For instance, when an application is no longer required or desired, all Informatica® or other computing environment objects may be exported and/or all Linux®, UNIX®, or other operating system objects may be compressed into a single file for historical storage for specific retention.

The application modification functionality of the user interface may include the ability to update and/or modify Linux®, UNIX®, operating system, and/or other security features. For instance, the user interface may be configured to provide the administrator (or other user) with the ability to update Linux®-based, UNIX®-based, and/or other directories, and/or to update file security, such as file security associated with a new or existing group of users.

The application modification functionality of the user interface may include the ability to update and/or modify application space, memory, or computer storage requirements. For instance, the user interface may be configured to allow or present space requirement information regarding or associated with updates to file system estimates and/or per environment. The information presented on the user interface may be captured during application setup.

The application modification functionality of the user interface may include the ability to update and/or modify application users. For instance, the user interface may be configured to facilitate the (i) modification of user roles; (ii) addition of new users; (iii) removal of existing users; and/or (iv) update test analyst project termination date.

The application modification functionality of the user interface may include the ability to update and/or modify connections. For instance, the user interface may be configured to modify existing connections; add new connections; and/or remove connections. The user interface may also be configured to capture various types of information. As an example, the user information may be configured to capture information related to (i) connection object names; (ii) connection credentials; (iii) code pages; and/or (iv) connection environment specifics.

The application modification functionality of the user interface may include the ability to update and/or modify object security, including Informatica® or other computer environment object security. The user interface may be configured to provide the user with the ability to update folder and/or connection security across an environment cluster.

D. Exemplary Application Deployment Functionality

The exemplary user interface may include the ability for an administrator (and/or other user) to deploy an application and/or related functionality. The user interface may be configured to deploy all Informatica® or other software components required for an application to function. A dedicated screen may initiate the deployment to an environment cluster (deployment to multiple environments to enable a form of higher availability and workload distribution).

The exemplary user interface may include the ability for an administrator (and/or other user) to create an application deployment and/or related functionality. The user interface may capture various types of information related to application deployment, including component listing; change management record number(s); and/or deployment timing. The exemplary user interface may also include the ability for an administrator (and/or other user) to cancel and/or edit an application deployment.

E. Exemplary Administer Functionality

The exemplary user interface may include administration and/or administer functionality. Exemplary administration functionality may provide the ability to administer items required for central administration to function, as well as Informatica® or other computing environments. The exemplary administration functionality may include the ability to (a) define an environment cluster; (b) add a node to an existing environment; (c) define a new service; and/or (d) setup a new server. The administration functionality may include additional, less, or alternate functionality, including that discussed elsewhere herein.

The exemplary administration and/or administer functionality of the user interface may include the ability to define an environment cluster. For instance, the user interface may allow the administrator or other user to create and/or modify environment clusters and their associated domains and/or repository.

The exemplary administration and/or administer functionality of the user interface may include the ability to add and/or modify a node, such as a node for a new or existing environment. For instance, the user interface may be configured to allow a new node to be configured in a central administration-related database or server, and then may execute one or more installation processes, as well as join or interconnect with appropriate domain(s) as a gateway or worker node.

The exemplary administration and/or administer functionality of the user interface may include the ability to define new services. For instance, the user interface may be configured to allow Informatica® and/or other application or computer environment services to be added to existing domains.

The exemplary administration and/or administer functionality of the user interface may include the ability to setup a new server, such as new server related to an application or computing environment. As an example, the user interface may be configured to allow a new node to be configured in a central administration computing environment, and then may execute one or more installation processes, define the node as a gateway node, and/or then create a domain with the node and/or another domain.

II. Exemplary Central Processing Server

A central processing server may be configured to perform various functions related to the central administration of multiple applications and the integration thereof in various computing environments. An exemplary server may host: (a) the user interface; (b) computer-implemented processes to capture environmental information; (c) processes to capture and/or store backups and other files; (d) installation file locations; and/or other functions, including those discussed elsewhere herein. The server may be configured to have a redundancy allowing for high availability of these and/or other processes.

The exemplary central processing server may be configured to (1) execute deployment; (2) capture environment information; (3) execute administration functions; and/or (4) file archives. The central processing server may be configured to perform additional, less, or alternate functionality, including that discussed elsewhere herein.

The exemplary central processing server may be configured with deployment execution functionality. Exemplary deployment execution functionality may include at a set interval or other timeframe, querying deployment details from the central database. The Informatica® or other computing environment deployment process may then be initiated between environments.

The exemplary central processing server may be configured with functionality related to, and/or associated with, capturing computer environment information. Such functionality may pull all Linux®, UNIX®, operating system, and/or infrastructure information required for the central administration user interface to be dynamic, as well as the data required for auditing and/or statistical reporting.

The data capturing functionality may be related to so-called ping environments. For instance, the present embodiments may ping Informatica® specific services, and/or other computer environment specific services, every few minutes or periodically. Ping failures may be captured into a central database, and/or other database, for uptime reporting.

Additionally or alternatively, the data capturing functionality may be related to or associated with gathering or collecting load domain and/or repository information. The data captured may be related to pull environment specific Informatica® (or other computer environment) metadata and/or server(s) from each environment into a central database.

The exemplary central processing server may be configured with functionality related to and/or associated with executing administrative functions. This functionality or process may run at regular or other intervals. Once the server detects actions that may be required, it may execute the appropriate administrative task using the information previously captured. These administrative tasks may include anything required to setup a new Informatica® (or other computer environment) server and/or service, such as: (i) user profile details; (ii) file systems and/or security; (iii) automation scripts; (iv) crontab entries; (v) monitoring processes; (vi) adding or deleting nodes; and/or (v) defining various services.

The exemplary central processing server may be configured with functionality related to and/or associated with filing archives. For instance, the server may store backups from all environments, as well as installation files.

III. Exemplary Remote Server Processes

The present embodiment may include certain remote server processing that may be run on each node in an Informatica® or other computer environment. The computer processing may execute environment specific tasks and load data/files into the central server.

The remote server functionality may be related to and/or associated with backup processes; capturing computer/application environment information; and/or creating, modifying, and/or updating applications. The remote server functionality may include additional, less, or alternate functionality, including that discussed elsewhere herein.

The remote server functionality may be related to and/or associated with backup processes. This functionality and/or computer-implemented processes may execute Informatica® and/or computer environment specific backups.

The remote server processes may include functionality related to backup domain and/or repositories. For instance, the remote server may be configured to execute domain and/or repository backups on each environment. The backups may then be copied to a central server. In one embodiment, success and/or fail indicators may be loaded into the central database.

Additionally or alternatively, the remote server may be configured with backup server configuration functionality. For instance, the remote server may be configured to execute the backups of disaster backup scripts. The backups may then be copied to the central server. In another embodiment, success and/or fail indicators may be loaded into the central database.

The remote server functionality may be related to and/or associated with capturing environment information. The remote server may be configured to capture environment specific details. Details captured by the remote server may include: (i) Linux®, UNIX®, and/or other operating system user and/or groups; (ii) server configurations (e.g., database client versions and/or server release versions); (iii) Linux®, UNIX®, and/or other operating system directory details (e.g., file system size and/or file permissions); and/or (iv) server health (e.g., uptime, core files, and/or error files). These types of details may then be loaded into a central database for auditing and/or statistical reporting.

The remote server functionality may be related to and/or associated with creating, modifying, and/or updating applications. For instance, the remote server may be configured to create actual objects required to run an Informatica® or other application. The applications may be associated with (i) Linux®, UNIX®, and/or other operating system directories and/or security; (ii) Informatica® or other computer environment objects and/or security; and/or (iii) database catalogs.

IV. Exemplary Reporting

The present embodiments may provide central administration of applications authorized for use with a computer environment. The central administration functionality may utilize the capabilities discussed herein, and utilize the data that has been made available via the processes of the present embodiments.

The central administration functionality may include central reporting capabilities that may present and/or display a holistic view of applications and infrastructures across all levels of a test or administration environment. The reporting may be logically grouped, such as grouped into 3 subject areas: (1) environmental uptime; (2) environmental statistics; and/or (3) auditing. The central reporting functionality may include additional, less, or alternate capabilities, including that discussed elsewhere herein.

The central administration functionality may be related and/or associated with environmental uptime. For instance, the user interface associated with central administration may present and/or display a grouping that may be dedicated to reporting uptime of environments and/or individual services. This functionality may facilitate meeting business partner requirements and/or other requirements.

The central administration functionality may be related to and/or associated with computer environmental statistics. For instance, the user interface associated with central administration may present or otherwise display a group of reports that provides facts about all Informatica® or other computing environments. Specific counts of object types and environment and/or application run times may be a couple examples of the reports within this grouping.

The central administration functionality may be related and/or associated with auditing. For instance, the user interface associated with central administration may present or otherwise display a group of reports that may ensure optimal security and/or visibility into the various components required to appropriately manage an Informatica® and/or other computer environment application. Many of these reports may lead to enhanced functionality of the central administration utility of the present embodiments.

V. Conventional Techniques

Traditionally, deploying a new application environment was a highly manual process. In order to set up each new application, an administrator needed to log into a web portal and create three separate application specific security groups adhering to required naming standards: one group for "coordinators" (e.g., leads), one group for general developers, and one group for test analysts. The user must further add appropriate users to the application specific group previously created and remove the default group. If a new user is added in this way, the administrator also adds the appropriate role for application privileges. This process is repeated for each user. After the administrator logs off of the web portal, the administrator logs onto a workstation client and creates three or more folders conforming to the required naming standards: a main folder for issuance, a test folder, and one or more individual folders for each developer added to the application.

The administrator may further modify the owner, add three or more appropriate support groups and set specific permissions for each of the groups. The administrator also may add the group previously created in a web portal through the workstation, sets the specific permissions and removes the default created "others" group. Once completed, the administrator then selects the shortcut for Workflow Manager client software in order to create required connections to source & target systems, which may include anywhere from two through over one hundred connections per application. Creating the required connections may include entering the connection name conforming to naming standards, entering a dummy user name password, entering connection information, and setting appropriate code page and/or other configurations.

The administrator may further select the security tab in order to modify the owner, add appropriate support groups, set specific permissions, add application groups previously created, set specific permissions and remove the default "others" group. After saving, the administrator may log off of the client tools and then log on to a Linux® server, UNIX® server and/or server of another operating system, in order to perform a variety of steps. The administrator may create work space directories for data and configuration files, twenty-one directories for each application, as well as apply the appropriate security groups and permission settings to each directory. In addition to these steps, the administrator may further add test analyst ID's to a calendar for removal after a specified amount of time, and add a connection creation date to a calendar for restricting a user's ability to change credentials. The web portal, workstations and other servers may each run different operating systems, adding further complication to the administration and deployment of environments.

VI. Exemplary Central Administration

FIG. 1 illustrates aspects of an exemplary architecture implementing a system 100 for deploying a requested action in an application environment. The high-level architecture may include both hardware and software applications, as well as various data communications channels for communicating data between the various hardware and/or software components.

A. Exemplary Front End Components

The exemplary system 100 for deploying a requested action in an application environment may include front end components 102, including a client computing device 104. According to the present embodiment, a processor of the client computing device 104 may execute instructions to transmit data to or otherwise communicate with back end components 108 via the computer network 106. The computer network 106 may be a network such as the Internet or other type of suitable network (e.g., local area network (LAN), a metropolitan area network (MAN), a wide area network (WAN), a mobile, a wired or wireless network, a private network, a virtual private network, etc.). The computer network 106 may also be one or more cellular networks such as code division multiple access (CDMA) network, GSM (Global System for Mobile Communications) network, WiMAX (Worldwide Interoperability for Microwave Access) network, Long Term Evolution (LTE) network, etc.

B. Exemplary Back End Components

The back end components 108 may include a central processing node 110 and one or more remote server nodes 112. Although FIG. 1 depicts three remote server nodes 112, this is for example only and any number of remote server nodes 112 may be used. In one aspect, each of the server nodes 112 may run different operating systems than the other server nodes 112 as well as different operating systems as the central processing node 110 and/or the client computing device 104. For example, some of the server nodes, central processing node 110, and/or client computing device 104 may run one or more variations of the Linux® operating system, one or more variations of the UNIX® operating system, the Microsoft® Windows® operating system, and/or additional operation systems. The back end components 108 may communicate with each other through a communication network 117 such as a local area network or other type of suitable network (e.g., the Internet, a metropolitan area network (MAN), a wide area network (WAN), a mobile, a wired or wireless network, a private network, a virtual private network, etc.).

C. Exemplary Central Processing Node

The central processing node 110 may include a central processing server 114 and/or a central database 116. The central processing server may execute instructions 114a for generating a user interface for deploying a requested action in an application environment, as well as software routines for capturing environmental information, capturing and storing backups and other files and installation file locations. The central database may store data 116a such as environment specific metadata, auditing data, etc. The central processing server 114 may connect to the central database 116 via a computer network 115 such as a local area network or other type of suitable network (e.g., the Internet, a metropolitan area network (MAN), a wide area network (WAN), a mobile, a wired or wireless network, a private network, a virtual private network, etc.).

For example, the central processing server 114 may execute one or more instructions to generate a status dashboard to provide an overview for an administrator to view environment health view by domain. In one aspect, one or more visual indicators may be associated with one or more health statuses of the domain. For example, a green font may indicate that the environment is healthy, a red font may initiate one or more problems, etc. An administrator may also take further action from the overview to view more detailed information. For example, the administrator may click on a domain name to drill down for more granular statuses. The more granular statuses may include domain level health items, domain backups, repository backups, node statuses, quick reference links to domain services (admin console, reporting service, analyst service, etc. . . . ), log retention processes, etc. The administrators may also be able to drill down to node specific statuses, including node specific health items, disaster backups (configurations required to quickly restore an environment), database client versions, server release information, uptime, file system statuses (indicator for negative trending) and/or other miscellaneous items.

The central processing server 114 may also execute one or more deployment scripts which query the central database at a set interval, to collect deployment details. Once the details are received, the deployment process may then be initiated between environments. A processor of the central server may also execute a script to ping one or more environments or services at regular intervals. Ping failures may be captured into the central database for uptime reporting. The processor may execute administrative scripts that run at regular intervals to determine if administrative actions are required. If the processor executing the script determines that actions are required, the processor may execute the appropriate administrative task using the information previously captured. In one aspect, the processor may further execute an instruction to capture additional information. Example administrative tasks may include anything required to setup a new server node and/or service, such as: user profile details, file systems/security, automation scripts, crontab entries, monitoring processes, define service. This server stores backups from all environments as well as installation files.

D. Exemplary Status Dashboard

The status dashboard may also include a view database search utility that pulls all database catalogs to one location. In some aspects, the catalog capture may include DB2, Oracle®, and ODBC database catalogs. In addition to allowing the user to add and/or remove connections, the view database search utility may allow the user to report on Informatica® connection objects that utilize each of the included catalogs. The status dashboard may further include an actions required portion for capturing and/or tracking issues that require actions. In some aspects, the actions required dashboard may also include core files, process monitoring and environmental discrepancies. An application setup module may display recent application setup requests, as well as the status of the request (i.e., in progress, complete, removed). The application setup module may also provide the ability to search for historical requests to see their status.

E. Exemplary Node Processing

Certain processing may be run on each node in an Informatica® environment. Each remote server node may include a remote server 118 and a remote database 120. The remote server 118 may execute a set of instructions 118a to execute environment specific tasks and load data 120a into the remote database 120 and/or central database 116. The remote server 118 may connect to the remote database 120 via a computer network 119 such as a local area network or other type of suitable network (e.g., the Internet, a metropolitan area network (MAN), a wide area network (WAN), a mobile, a wired or wireless network, a private network, a virtual private network, etc.).

The remote server 118 may execute environment specific backups, server configuration backups, and copies the backup to the remote database 120 and/or central database 116. The processor executing the backup process may further record success/fail indicators into the central database, capture environment specific information, such Linux®, UNIX® and/or other operating system user/group; server configurations (database client versions; server release versions), Linux®, UNIX® and/or other operating system directory details (file system size, file permissions), server health (uptime, core files, error files), etc. These details may then be loaded into the remote database 120 and/or central database 116 for auditing/statistical reporting. The remote server nodes may also execute instructions to create and/or update applications including the actual objects required to run an application including Linux®, UNIX® and/or other operating system directories/security, Informatica® objects/security, database catalogs, etc.

The exemplary system 100 shown in FIG. 1 may include additional, fewer, or alternate components, including those discussed elsewhere herein.

VII. Exemplary Action Deployment in Application Environment

Figure 2:
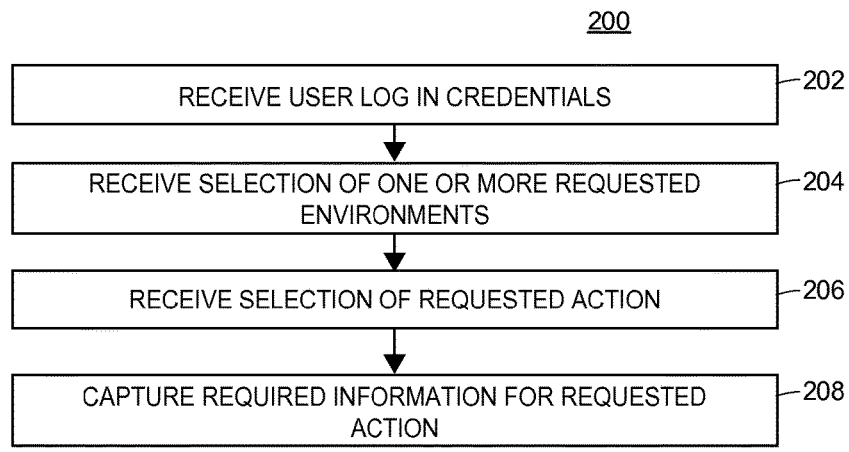
FIG. 2 is a flow chart illustrating an exemplary method for central administration of multiple application environments.

FIG. 2 is a high level flow chart of an exemplary method, routine or process 200 for central administration of multiple application environments. A user, such as an administrator, may use a client device, such as the computing device 104 illustrated in FIG. 1 to access a central processing server (such as the central process server illustrated in FIG. 1). The administrator may access the central processing server by entering the user log in credentials. A processor of the central processing server may receive the user log in credentials (block 202), such as a user name, password, finger print scan, etc., as well as validate the credentials, using one or more validation techniques. The processor may further record a portion, and/or all of, the log in credentials for auditing purposes.

The user may also select one or more application environments to perform actions in and the processor of the central processing server may receive the selection of the one or more application environment (block 204). For example, the selection may indicate a new development environment, a production environment, etc. The user may also select one or more actions to be performed in the application environments and the processor may receive the selection of the one or more actions (block 206). The actions may include creating a new application environment, modifying an existing application environment of the selected type, creating new groups, etc.

In one aspect, the administrator may use an application setup wizard to enter configuration information including application environments and requested actions. The application setup wizard may be a set of web forms to capture information and initiate an application setup process. The application setup wizard may further require validation of requirements performed during entry of data. Furthermore, each individual component that is captured may be associated with a common key for reporting, maintenance and/or auditing purposes. Information that may be captured includes application name, application description, project number, implementation timeline (per environment), source systems, estimated server execution times, type of target environment/location, existing Linux®, UNIX® and/or other operating system security (if additional structure to existing project), change management record number, sensitive data status, file system estimates per environment (broken out by major type, i.e. source files, target files, cache, etc. . . . ), users and their role (coordinators/leads, developers, test analysts, etc.), connection details, etc. Of course the information captured may be from one or more data entry pages of the setup wizard which may be split up by type or group of information. The setup wizard may also include a confirmation page that displays setup instructions. In one aspect, an email confirmation may be sent to business partners with setup instructions.

The processor may also capture the information required for the requested action (block 208). Such information may include, project name, description, time frame, estimated time for completion, estimated time for milestones, frequency of updating (hourly, quarterly), etc. Additional actions may also revolve around adding users to the environment. For example, the action may add a new user, remove a user, create or remove a group of users, adjust security for an individual user or group of users, etc. Although sample environments are provided, those of ordinary skill in the art will recognize that any number of different types of application environments may be selected. Although in one aspect, the method 200 may be used to perform an action in one application environment, those of ordinary skill in the art will appreciate the efficiency and time savings that comes with performing actions in multiple application environments using the same information.

The processor of the central server may also execute an instruction to perform the requested action. For example, the processor may execute an instruction to deploy a new application environment, editing an existing environment, etc. In one aspect, one or more scripts may be executed at regular intervals to retrieve requested actions and the corresponding required information and perform the requested actions. The exemplary method 200 may include additional, fewer, or alternate actions, including those discussed elsewhere herein.

VIII. Exemplary Action Deplyment Flowchart

Figure 3:
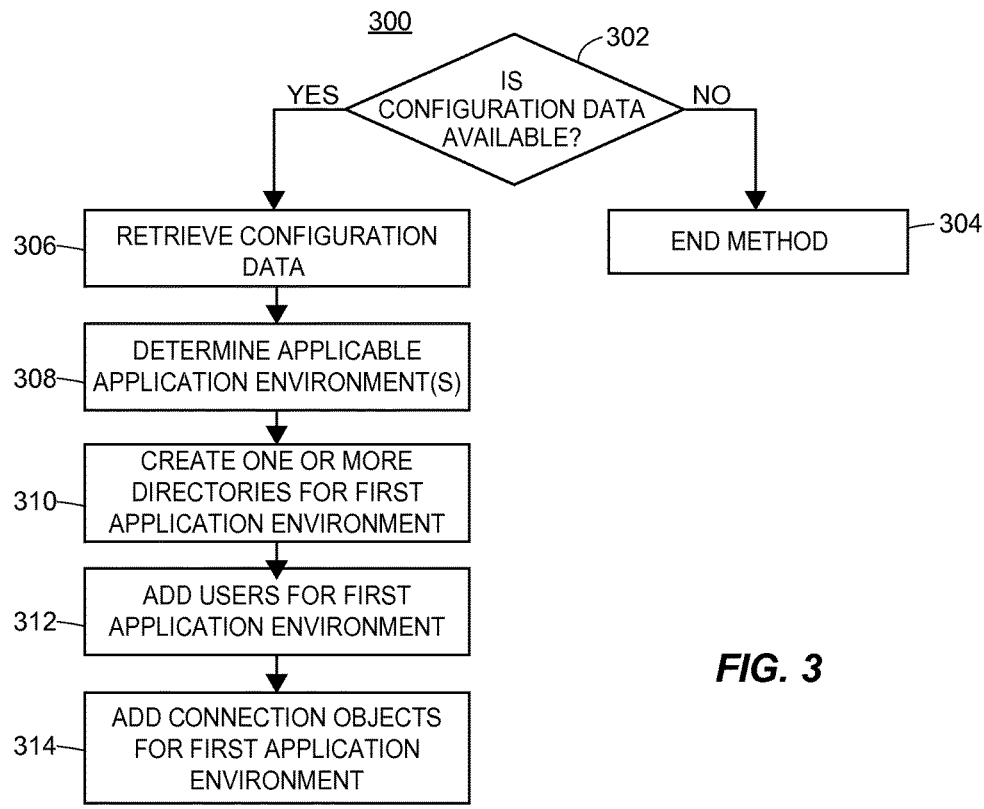
FIG. 3 is a flow chart illustrating an exemplary method for deploying a requested action in an application environment.

FIG. 3 is a high level flow chart of an exemplary method, routine or process 300 for deploying a requested action in an application environment. A user, such as an administrator, may use a client device, such as the computing device 104 illustrated in FIG. 1 to access a central processing server (such as the central process server 114 illustrated in FIG. 1).

A processor of a central processing server may execute an instruction to query a database (such as the central database 116 illustrated in FIG. 1) at regular intervals to determine if configuration data is available. If the processor executing the instruction determines that configuration data is not available (NO branch of block 302), the processor may end the method (block 304) and/or execute an instruction to query the central database at the next interval.

If the processor executing the instruction determines that configuration data is available (YES branch of block 302), the processor may execute an instruction to retrieve the configuration data (block 306) and determine one or more applicable application environments for the application data (block 308). The processor may further execute an instruction to create one or more directories for each application environment (block 310).

In one aspect, the directories may be created based upon the configuration data, based on application environment defaults, or a combination thereof. The directories may be used to store data files associated with the application environment. Importantly, the directories may be created in different operating system environments (block 312).

The processor may also execute an instruction to add one or more users for each application environments. In one aspect, the processor may also execute an instruction to create one or more groups of users, as well as to set permissions for each user and/or group. The processor may further execute an instruction to create one or more connection objects (block 314). Connection objects may be application environment objects, such as Informatica® application environments, that store connection information, such as user name and password combinations.

One or more of the steps in the exemplary method 300 may be repeated for each application environment. The exemplary method 300 may include additional, fewer, or alternate actions, including those discussed elsewhere herein.

IX. Exemplary Server Node Deployment

Figure 4:
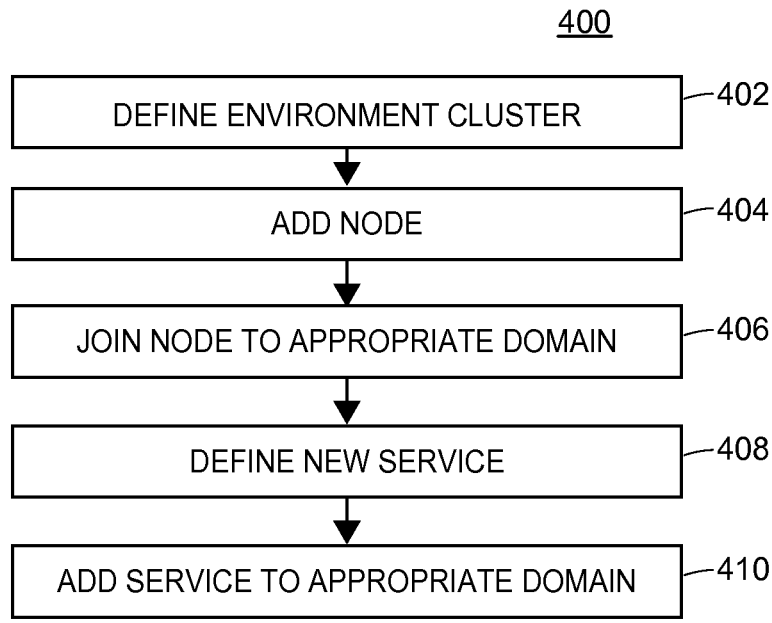
FIG. 4 is a flow chart illustrating an exemplary method for deploying a server node.

FIG. 4 is a high level flow chart of an exemplary method, routine or process 400 for deploying a server node. The method 400 provides the ability to administrator items required for the central processing server to function as well as Informatica® environments. A user, such as an administrator, may use a client device, such as the computing device 104 illustrated in FIG. 1 to access a central processing server (such as the central process server 114 illustrated in FIG. 1).

A processor of the server may execute an instruction to define one or more environment clusters (block 402). For example, the processor may execute an instruction to create and/or modify environment clusters and associated domains/ repositories. In this context, an environment cluster may refer to a logical grouping of a set of Informatica® environments which may contain identical objects.

In one aspect, the processor may execute an instruction to create or modify an environment cluster as well as one or more associated domains for each cluster. The processor may also execute an instruction to add one or more additional nodes to an existing environment (block 404). As part of adding the node, the processor may further execute an instruction to configure the node, execute the installation process for the node and/or add the new node to the appropriate domain as a gateway node or a worker node.

The processor may further execute an instruction to define one or more server nodes to be added to existing domains (block 406). For example, the processor may execute an instruction to add one or more Informatica® services to existing domains. The processor may also execute an instruction to use the configuration information to setup one or more server nodes. For example, the processor may execute an instruction to configure the new node, execute the installation process for the new node, and/or create a domain. In one aspect, the new node may be defined as a gateway node.

The processor may also execute an instruction to define a new service (block 408) and/or add the new service to the appropriate domain (block 410). The exemplary method 400 may include additional, fewer, or alternate actions, including those discussed elsewhere herein.

X. Modification of an Application Environment

Figure 5:
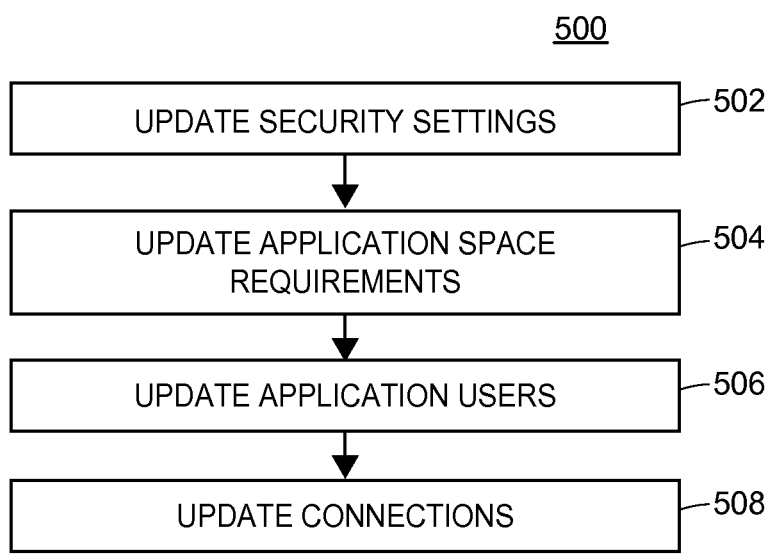
FIG. 5 is a flow chart illustrating an exemplary method for modifying an application environment.

FIG. 5 is a high level flow chart of an exemplary method, routine or process 500 for modifying an application environment. A user, such as an administrator, may use a client device, such as the computing device 104 illustrated in FIG. 1 to access a central processing server (such as the central processing server 114 illustrated in FIG. 1) and may be provided with a grouping of options to make changes to existing applications. The administrator may make a selection to perform an action on an existing application environment. For example, the administrator may select an option to remove the environment, adjust security settings, user groups etc. In response, the central processing server 114 may receive an indication of the existing application environment, as well as an indication of the action to perform.

The processor of the central server may also execute an instruction to perform the requested action. In one aspect, the processor may further execute an instruction to capture information to perform one or more of the requested actions. For example, the processor may execute an instruction to deploy a new application environment, edit an existing environment, etc. In one aspect, one or more scripts may be executed at regular intervals to retrieve requested actions and the corresponding required information and/or perform the requested action(s).

In one aspect the central processing server may receive an indication to remove an application environment. For example, when an application environment is no longer required, all Informatica® objects may be exported and/or all Linux®, UNIX® and/or or other operating system objects may be compressed into a single file for historical storage for specific retention.

The processor may execute an instruction to update security settings (block 502). For example, the processor may execute an instruction to update Linux®, UNIX® and/or or other operating system directory and file security to a new group. As another example, the instruction executed by the processor may update Informatica® object security, including updating folder and connection security across environment cluster.

The processor may further execute an instruction to update application space requirements (block 504). In one aspect, this instruction may include updates to file system estimates for each environment.

The processor may also execute an instruction to update application users (block 506). This instruction may include modifying user roles, adding new users, remove existing users; updating dates, such as test analyst project termination dates, etc.

The processor may further execute an instruction to update connections (block 508) including modifying existing connections, adding new connections, remove connections, etc. In one aspect, the processor may further execute an instruction to capture information including connection object names, connection credentials, code pages, connection environment specifics in order to update the connections.

The exemplary method 500 may include additional, fewer, or alternate actions, including those discussed elsewhere herein.

XI. Exemplary Routine for Generating an Auditing Report

Figure 6:
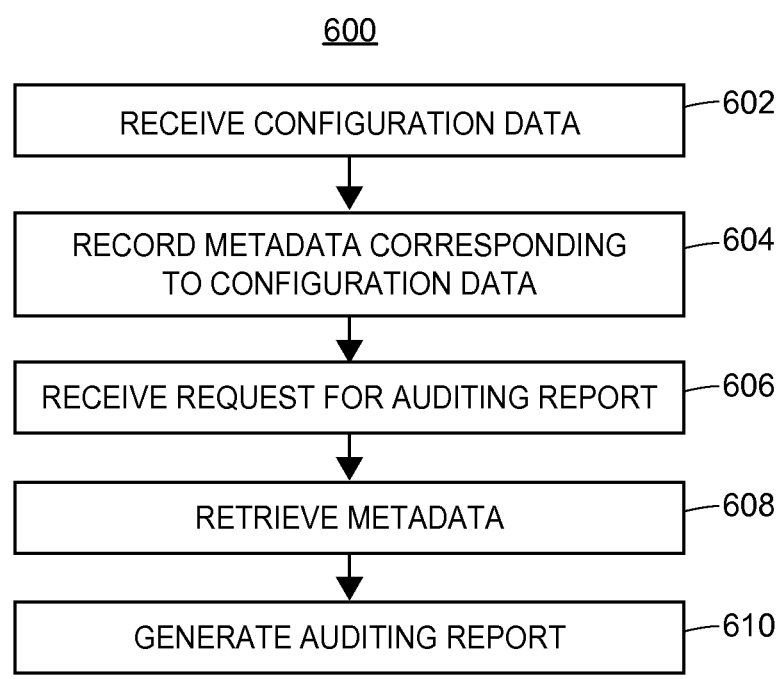
FIG. 6 is a flow chart illustrating an exemplary method for generating an auditing report.

FIG. 6 is a high level flow chart of an exemplary method, routine or process 600 for generating an auditing report. In one aspect, the system and method for central administration of multiple application environments leverages configuration information as well as metadata collected to provide auditing reports. A server, such as the central processing server 114 illustrated in FIG. 1, may receive the configuration data (block 602) and a processor of the server may execute an instruction to record metadata corresponding to the configuration data captured (block 604).

The metadata may be saved to a database, such as the central database 16 illustrated in FIG. 1. For example, the processor executing the instruction may record metadata corresponding to configuration data captured for a first environment, second environment, etc. Metadata may include user identification, time, data, originating computer/ server/work station, etc. The metadata may be structured in one of a variety of formats. In one aspect, metadata may be recorded for multiple configurations as well as other tasks performed by one or more parts of the central administration of multiple application environments, such as those depicted in the system 100 illustrated in FIG. 1.

The server may further receive a request for an auditing report (block 606). In one aspect, an administrator or other user may input a request for an auditing report, while in some aspects, the processor of the server may execute an instruction to prepare an auditing report at certain intervals, for example, a regular interval such as every week, etc. The processor of the server may further execute an instruction to retrieve the metadata (block 608) and generate an auditing report including the metadata (block 610). In one aspect, the auditing reports include at least the metadata of the user credential corresponding to the configuration data captured for the first and second application environments.

The exemplary method 600 may include additional, fewer, or alternate actions, including those discussed elsewhere herein.

XII. Exemplary Data Servers

Figure 7:
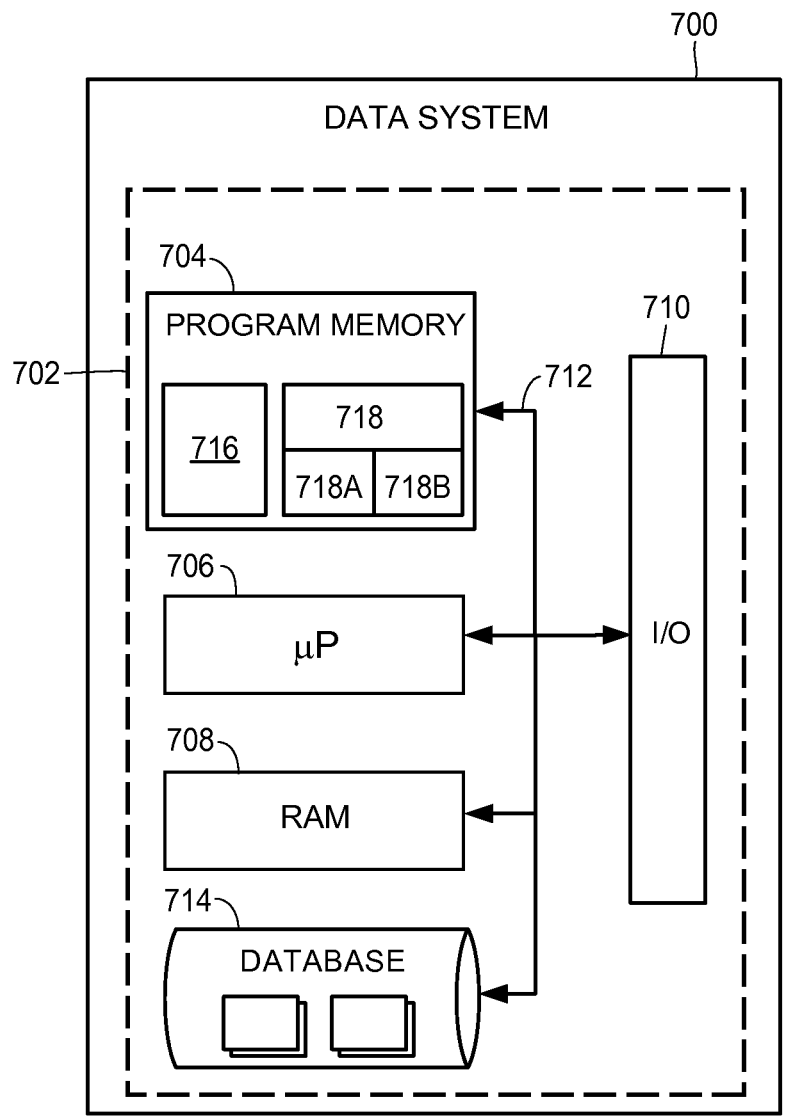
FIG. 7 is an exemplary architecture of a data system.

Referring now to FIG. 7, a data server 700 may include a controller 702. Exemplary data servers may include the servers 114 and 118 illustrated in FIG. 1. The controller 702 may include a program memory 704, a microcontroller or a microprocessor (μP) 706, a random-access memory (RAM) 708, and an input/output (I/O) circuit 710, all of which are interconnected via an address/data bus 712. The program memory 704 may store computer-executable instructions, which may be executed by the microprocessor 706. In one aspect, the controller 702 may also include, or otherwise be communicatively connected to, a database 714 or other data storage mechanism (e.g., one or more hard disk drives, optical storage drives, solid state storage devices, etc.). It should be appreciated that although FIG. 7 depicts only one microprocessor 706, the controller 702 may include multiple microprocessors 706. Similarly, the memory 704 of the controller 702 may include multiple RAMs 716 and multiple program memories 718, 718A and 718B storing one or more corresponding application modules, according to the controller's particular configuration. The data server 700 may also include specific routines to be performed by the data server 700.

Although FIG. 7 depicts the I/O circuit 710 as a single block, the I/O circuit 710 may include a number of different types of I/O circuits (not depicted). The RAM(s) 708, 704 and the program memories 718, 718A and 718B may be implemented in a known form of computer storage media, including but not limited to, semiconductor memories, magnetically readable memories, and/or optically readable memories, for example, but does not include transitory media such as carrier waves. The data server may include additional, fewer, or alternate components, including those discussed elsewhere herein.

XIII. Exemplary Computer-Implemented Method

In one aspect, a computer-implemented method for deploying applications and/or application environments may be provided. The method may include: (1) receiving, via a computer network, a selection of a first and a second application environment; (2) capturing, at a central processing server, configuration data for the first and second application environment, the configuration data including user data and connection data; and/or (3) deploying, by one or more processors, a first application environment, including: (a) creating, by the one or more processors, a first directory required by the first application environment; (b) adding, by the one or more processors, one or more users to the first application environment based on the user data; and/or (c)

adding, by the one or more processors, one or more connection objects based on the connection data. The method may include: (4) deploying a second application environment including: (d) creating, by the one or more processors, a second directory required by the second application environment; (e) adding, by the one or more processors, one or more users to the second application environment based on the user data; and (f) adding, by the one or more processors, one or more connection objects based on the connection data. As a result, the method may facilitate the rapid, consistent, error-free, and/or efficient deployment of multiple applications and/or application environments by a central administrator.

The computer-implemented method may include automatically querying the central processing server at a set interval; and/or retrieving the configuration data from the central processing server. The computer-implemented method may include creating, by the one or more processors, a user group based on the user data; adding, by the one or more processors, a first user to the user group; and/or adding, by the one or more processors, a second user to the user group.

The computer-implemented method may include executing a first script in a first operating system environment to create the first directory; and/or executing a second script in a second operating system environment to add the one or more users to the first application environment. The computer-implemented method may include recording user metadata of a user credential corresponding to the configuration data captured for the first and second application environment.

The computer-implemented method may include generating an auditing report defining one or more users entering configuration data to the central processing server. The auditing report may include at least the metadata of the user credential corresponding to the configuration data captured for the first and second application environment.

XIV. Exemplary User Interface for Central Administration

In one aspect, a user interface for the central administration of multiple applications and/or application environments may be provided. The user interface for the central administration may include functionality related to, and/or otherwise graphically depict and/or visually represent items associated with, (1) an environment status dashboard; (2) an application setup wizard; (3) application modification; (4) application deployment; and/or (5) administration. The functionality and/or visual representations may be displayed and/or associated with one or more screens of the user interface for the central administration of multiple applications and/or application environments.

The user interface for central administration may include an environment status dashboard. The status dashboard may provide drill down capability to various domain level and/or node specific health items. The status dashboard may also include functionality associated with or visually represent (1) a view of database catalogs; (2) actions required for central administration of the multiple applications and/or application environments; (3) updated outage reporting; and/or (4) application setup progress and/or requests. The environment status dashboard may include additional, less, or alternate functionality, including that discussed elsewhere herein.

The user interface for central administration may include an application setup wizard. The application setup wizard may include functionality that facilitates application initiation and/or deployment, validation, and/or information capture, as discussed elsewhere herein.

The user interface for central administration may include application modification capabilities. As discussed elsewhere herein, the user interface may be configured to allow an administrator to remove, modify, or update an application; update security-related functionality; update application users; update connections; and/or update object security.

The user interface for central administration may include application deployment capabilities. The user interface may allow an administrator to create an application deployment; and/or cancel or edit an application deployment, as discussed elsewhere herein.

The user interface for central administration may include administration capabilities. The user interface may allow an administrator to define an environment cluster; add a node to an existing environment; define new services; and/or setup new servers, as discussed elsewhere herein. The user interface for central administration may include additional, less, or alternate functionality, including that discussed elsewhere herein.

XV. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 104, the server 114, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 104 as a plug-in or other module of the browser application. Further, the methods may be employed as "software-as-a-service" to provide a computing device 104 with access to the system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for system and method for central administration of multiple application environments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for deploying application environments for multiple users, the method comprising:
   receiving, via a first user interface, a selection by an administrator of a first and a second application environment to deploy, wherein the selection indicates a first plurality of users and a second plurality of users;
   capturing, at a central processing server, configuration data for the first and second application environment, wherein the configuration data include user data and connection data associated with the first plurality of users and the second plurality of users;
   deploying, by one or more processors, a first application environment, wherein deploying the first application environment includes automatically executing a plurality of scripts in a plurality of operating system environments to perform the following actions:
      creating, by the one or more processors, a first directory required by the first application environment;
      adding, by the one or more processors, one or more users to the first application environment based on the user data; and
      adding, by the one or more processors, one or more connection objects based on the connection data;
   deploying, by the one or more processors, a second application environment,
   wherein deploying the second application environment includes automatically executing the plurality of scripts in the plurality of operating system environments to perform the following actions:
      creating, by the one or more processors, a second directory required by the second application environment;
      adding, by the one or more processors, one or more users to the second application environment based on the user data; and
      adding, by the one or more processors, one or more connection objects based on the connection data;
   generating, via a second user interface, a status dashboard that includes an actions required portion for displaying a plurality of actions to address application environment issues associated with process discrepancies within the first and second application environments;
   receiving, via the second user interface, a user selection of a first action of the plurality of actions, which first action is associated with the first application environment;
   implementing, by the one or more processors, the first action within the first application environment;
   receiving, via the second user interface, a user selection of a second action of the plurality of actions, which second action is associated with the second application environment; and
   implementing, by the one or more processors, the second action within the second application environment.

2. The computer-implemented method of claim 1 further comprising:
   automatically querying the central processing server at a set interval; and
   retrieving the configuration data from the central processing server.

3. The computer-implemented method of claim 1 further comprising:
   creating, by the one or more processors, a user group based on the user data;
   adding, by the one or more processors, a first user to the user group; and
   adding, by the one or more processors, a second user to the user group.

4. The computer-implemented method of claim 1 further comprising:
   executing a first script in a first operating system environment to create the first directory; and
   executing a second script in a second operating system environment to add the one or more users to the first application environment.

5. The computer-implemented method of claim 1 further comprising:
   recording user metadata of a user credential corresponding to the configuration data captured for the first and second application environment.

6. The computer-implemented method of claim 5 further comprising:
   generating an auditing report defining one or more users entering configuration data to the central processing server, wherein the auditing report includes at least the metadata of the user credential corresponding to the configuration data captured for the first and second application environment.

7. A computer device for deploying application environments for multiple users, the device comprising:
   one or more processors; and
   one or more memories coupled to the one or more processors;
   the one or more memories including non-transitory computer executable instructions stored therein that, when executed by the one or more processors, cause the one or more processors to:
   receive, via a user interface, a selection by an administrator of a first and a second application environment to deploy, wherein the selection indicates a first plurality of users and a second plurality of users;
   capture configuration data for the first and second application environment, wherein the configuration data include user data and connection data associated with the first plurality of users and the second plurality of users;
   deploy a first application environment, wherein deploying the first application environment includes automatically executing a plurality of scripts in a plurality of operating system environments to perform the following actions:
      creating a first directory required by the first application environment;
      adding one or more users to the first application environment based on the user data; and
      adding one or more connection objects based on the connection data;
   deploy a second application environment, wherein deploying the second application environment includes automatically executing the plurality of scripts in the plurality of operating system environments to perform the following actions:
      creating a second directory required by the second application environment;

adding one or more users to the second application environment based on the user data; and creating one or more connection objects based on the connection data;

generate a status dashboard that includes an actions required portion for displaying a plurality of actions to address application environment issues associated with process discrepancies within the first and second application environments;

receive a user selection of a first action of the plurality of actions, which first action is associated with the first application environment;

implement the first action within the first application environment;

receive a user selection of a second action of the plurality of actions, which second action is associated with the second application environment; and implementing the second action within the second application environment.

8. The computer device of claim 7, further comprising non-transitory computer executable instructions to cause the one or more processors to:

query the central processing server at a set interval; and retrieve the configuration data from the central processing server.

9. The computer device of claim 7, further comprising non-transitory computer executable instructions to cause the one or more processors to:

create a user group based on the user data;

add a first user to the user group; and add a second user to the user group.

10. The computer device of claim 7, further comprising non-transitory computer executable instructions to cause the one or more processors to:

execute a first script in a first operating system environment to create the first directory; and execute a second script in a second operating system environment to add the one or more users to the first application environment.

11. The computer device of claim 7, further comprising non-transitory computer executable instructions to cause the one or more processors to:

record user metadata of a user credential corresponding to the configuration data captured for the first and second application environment.

12. The computer device of claim 11, further comprising non-transitory computer executable instructions to cause the one or more processors to:

generate an auditing report defining one or more users entering configuration data to the central processing server, wherein the auditing reports includes at least the metadata of the user credential corresponding to the configuration data captured for the first and second application environment.

13. A tangible, non-transitory computer readable storage medium comprising instructions stored thereon for deploying application environments for multiple users, the instructions, when executed on one or more processors, cause the one or more processors to:

receive, via a user interface, a selection by an administrator of a first and a second application environment to deploy, wherein the selection indicates a first plurality of users and a second plurality of users;

capture configuration data for the first and second application environment, wherein the configuration data include user data and connection data associated with the first plurality of users and the second plurality of users;

deploy a first application environment, wherein deploying the first application environment includes automatically executing a plurality of scripts in a plurality of operating system environments to perform the following actions:

creating a first directory required by the first application environment;

adding one or more users to the first application environment based on the user data; and adding one or more connection objects based on the connection data;

deploy a second application environment, wherein deploying the second application environment includes automatically executing the plurality of scripts in the plurality of operating system environments to perform the following actions:

creating a second directory required by the second application environment;

adding one or more users to the second application environment based on he user data; and adding one or more connection objects based on the connection data;

generate a status dashboard that includes an actions required portion for displaying a plurality of actions to address application environment issues associated with process discrepancies within the first and second application environments;

receive a user selection of a first action of the plurality of actions, which first action is associated with the first application environment;

implement the first action within the first application environment;

receive a user selection of a second action of the plurality of actions, which second action is associated with the second application environment; and implementing the second action within the second application environment.

14. The tangible, non-transitory computer readable storage medium of claim 13, comprising further instructions stored thereon that cause the one or more processors to:

query the central processing server at a set interval; and retrieve the configuration data from the central processing server.

15. The tangible, non-transitory computer readable storage medium of claim 13, comprising further instructions stored thereon that cause the one or more processors to:

create a user group based on the user data;

add a first user to the user group; and add a second user to the user group.

16. The tangible, non-transitory computer readable storage medium of claim 13, comprising further instructions stored thereon that cause the one or more processors to:

execute a first script in a first operating system environment to create the first directory; and execute a second script in a second operating system environment to add the one or more users to the first application environment.

17. The tangible, non-transitory computer readable storage medium of claim 13, comprising further instructions stored thereon that cause the one or more processors to:

record user metadata of a user credential corresponding to the configuration data captured for the first and second application environment.

18. The tangible, non-transitory computer readable storage medium of claim 17, comprising further instructions stored thereon that cause the one or more processors to:
generate an auditing report defining one or more users entering configuration data to the central processing server, wherein the auditing reports includes at least the metadata of the user credential corresponding to the configuration data captured for the first and second application environment.

\* \* \* \* \*